United States Patent
Keshkamat et al.

(10) Patent No.: US 9,081,680 B2
(45) Date of Patent: Jul. 14, 2015

(54) SYSTEM-LEVEL ISSUE DETECTION AND HANDLING

(71) Applicant: Accenture Global Services Limited, Dublin (IE)

(72) Inventors: Sameer Keshkamat, Bangalore (IN); Prabir GhoushalKumar, Bangalore (IN); Gautam Choudhury, Bangalore (IN); Suhail Hagalwadi, Bangalore (IN); Prakash Ghatage, Bangalore (IN); Kunal Chaubey, Karnataka (IN)

(73) Assignee: Accenture Global Services Limited, Dublin (IE)

( * ) Notice: Subject to any disclaimer, the term of this patent is extended or adjusted under 35 U.S.C. 154(b) by 160 days.

(21) Appl. No.: 13/841,546

(22) Filed: Mar. 15, 2013

(65) Prior Publication Data

US 2014/0281676 A1 Sep. 18, 2014

(51) Int. Cl.
*G06F 11/07* (2006.01)
*H04L 12/24* (2006.01)
*G06Q 10/00* (2012.01)

(52) U.S. Cl.
CPC ........ *G06F 11/0793* (2013.01); *G06F 11/0709* (2013.01); *G06F 11/0748* (2013.01); *G06Q 10/20* (2013.01); *H04L 41/00* (2013.01)

(58) Field of Classification Search
CPC ............ G06F 11/0709; G06F 11/0748; G06F 11/0793; G06F 11/0703; G06F 11/0751; G06F 11/0775; G06F 11/0784; G06F 11/327; G06F 11/1441; H04L 41/00; H04L 41/0853; H04L 45/28; G06Q 10/00
See application file for complete search history.

(56) References Cited

U.S. PATENT DOCUMENTS

| 6,006,016 A | * | 12/1999 | Faigon et al. .................. 714/48 |
| 6,029,258 A | | 2/2000 | Ahmad |
| 6,983,362 B1 | * | 1/2006 | Kidder et al. ..................... 713/1 |

(Continued)

FOREIGN PATENT DOCUMENTS

| WO | WO 95/27249 | 10/1995 |
| WO | WO 00/68793 | 11/2000 |
| WO | WO 2011/056144 | 5/2011 |

OTHER PUBLICATIONS

Extended European Search Report in Application No. 14159950.6, dated Jul. 15, 2014, 7 pages.
Office Action in AU Application No. 2014201390, issued May 26, 2014, 4 pages.

(Continued)

*Primary Examiner* — Nadeem Iqbal
(74) *Attorney, Agent, or Firm* — Fish & Richardson P.C.

(57) ABSTRACT

Issue detection and handling technology in which issue definitions that enable detection of issues at different devices of an enterprise level system that operate different applications are maintained. Solution definitions that relate to resolving issues detected based on the issue definitions are also maintained. Issue detection logic based on the issue definitions is provided to each of the different devices of the enterprise level system. Issue detection information collected based on the issue detection logic is received from at least one of the different devices of the enterprise level system. Based on the issue detection information, an issue at the at least one device is determined. A solution definition related to resolving the determined issue is accessed from the solution definitions. Based on the accessed solution definition, an operation directed to handling the determined issue is performed.

19 Claims, 6 Drawing Sheets

(56) References Cited

U.S. PATENT DOCUMENTS

| | | | |
|---|---|---|---|
| 7,490,073 B1* | 2/2009 | Qureshi et al. | 706/50 |
| 7,668,953 B1* | 2/2010 | Sinclair et al. | 709/224 |
| 8,001,527 B1* | 8/2011 | Qureshi et al. | 717/120 |
| 8,170,975 B1* | 5/2012 | Qureshi et al. | 706/47 |
| 2004/0128583 A1* | 7/2004 | Iulo et al. | 714/25 |

OTHER PUBLICATIONS

Communication in EP Application No. 14159950.6, dated Sep. 22, 2014, 2 pages.

Office Action in AU Application No. 2014201390, issued Oct. 17, 2014, 3 pages.

* cited by examiner

Issue Definition Table

| ID 402 | Category 404 | Rule Description 406 | Monitoring Components 408 | Device 410 | Path 412 | Rules 414 | Frequency 416 | Status 418 |
|---|---|---|---|---|---|---|---|---|
| I101 | Application Monitoring | Image Conversion | Image Converter Exe | Device 1 | Path 1 | Rules 1 | Hourly | File Missing |
| I102 | Application Monitoring | Image Conversion | Image Converter Exe | Device 1 | Path 1 | Rules 2 | Before Run-time | File Corrupt |
| I103 | Application Monitoring | Image Conversion | Image Converter Exe | Device 1 | Path 1 | Rules 3 | Daily | Frozen |
| I104 | Interface Monitoring | Supplier Master Data | Feed File Processing | Device 2 | Path 2 | Rules 4 | Real-time | Insufficient Bandwidth |

FIG. 4

Solution Definition Table

| ID 502 | Issue ID 504 | Steps 506 | Action 508 |
|---|---|---|---|
| S101 | I101, I102 | 1 | Send Issue Alert |
| S101 | I101, I102 | 2 | Locate Image Converter Exe from Central Repository |
| S101 | I101, I102 | 3 | Move file to Device 1 at Path 1 |
| S101 | I101, I102 | 4 | Send Fix Alert |
| S102 | I103 | 1 | Send Issue Alert |
| S102 | I103 | 2 | Restart Server 1 |
| S102 | I103 | 3 | Send Fix Alert |
| S103 | I104 | 1 | Send Issue Alert |

FIG. 5

SYSTEM-LEVEL ISSUE DETECTION AND HANDLING

FIELD

Issue detection and handling.

BACKGROUND

Issues in computer systems may be detected. For example, a computer system may detect an error and the user may address the error.

SUMMARY

In one aspect, a system includes at least one processor and at least one memory coupled to the at least one processor having stored thereon instructions which, when executed by the at least one processor, causes the at least one processor to perform operations. The operations include maintaining issue definitions that enable detection of issues at different devices of an enterprise level system that operate different applications and maintaining solution definitions that relate to resolving issues detected based on the issue definitions. The operations also include providing, to each of the different devices of the enterprise level system, issue detection logic based on the issue definitions and receiving, from at least one of the different devices of the enterprise level system, issue detection information collected based on the issue detection logic. The operations further include determining an issue at the at least one device based on the issue detection information and accessing, from the solution definitions, a solution definition related to resolving the determined issue. In addition, the operations include performing an operation directed to handling the determined issue based on the accessed solution definition.

In another aspect, a method may include one or more of the operations described above. In yet another aspect, a computer-readable storage medium may be operable to cause a processor to perform one or more of the operations described above.

Implementations may include one or more of the following features. For example, the operations may further include associating the issue definitions with the different devices. Providing the issue detection logic may include providing each of the different devices issue detection logic based on the issue definitions and the associations of the issue definitions with the different devices.

In addition, the operations may further include associating the solution definitions with the issue definitions. Accessing the solution definition related to resolving the determined issue may include identifying the solution definition based on the association of the solution definition with the issue definition that enables detection of the determined issue.

Receiving the issue detection information may include receiving at regular intervals, from each of the different devices, issue detection information collected based on the issue detection logic.

Receiving the issue detection information may also include receiving, from each of the different devices, a status indicator representing a status of a device.

Further, receiving the issue detection information may include receiving, from each of the different devices, an identification of the at least one device. Accessing the solution definition related to resolving the determined issue may be based on the identification of the at least one device.

In addition, maintaining the issue definitions may include creating an issue definition that enables detection of an issue at one of the different devices of the enterprise level system.

Maintaining the solution definitions may include creating a solution definition that relates to resolving an issue at one of the different devices of the enterprise level system and associating the solution definition with an issue definition that enables detection of the issue.

Performing an operation directed to handling the determined issue may include restarting a service used by the at least one device.

Performing an operation directed to handling the determined issue may include correcting data used by the at least one device.

Performing an operation directed to handling the determined issue may include providing solution logic to the at least one device for the at least one device to handle the determined issue.

Performing an operation directed to handling the determined issue may include providing, to a user, a notification identifying the determined issue and one or more actions taken to handle the determined issue.

Performing an operation directed to handling the determined issues may include providing, to a user, a notification identifying the determined issue and instructing the user to handle the determined issue.

Further, performing an operation directed to handling the determined issues may include providing, to a user, a notification identifying the determined issue, one or more scripts associated with the determined issue, and instructing the user to handle the determined issue.

In addition, the operations may further include receiving, from a support device, an update to an issue definition of the issue definitions and providing, to a device of the enterprise level system, updated issue detection logic based on the updated issue definition.

In some examples, providing issue detection logic based on the issue definitions may include providing issue detection logic to an agent on a device of the enterprise level system, receiving issue detection information collected based on the issue detection logic may include receiving issue detection information collected by the agent on the device using the issue detection logic.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIG. 4 illustrates an exemplary issue definition table.

FIG. 5 illustrates an exemplary solution definition table.

DETAILED DESCRIPTION

An enterprise-level system may include different devices, each running the same or different applications. Enterprise-level devices may allow for devices to efficiently share resources, for example, services or data. However, an enterprise-level system may also experience various issues. For example, necessary files may be missing or corrupt, and necessary services may be unavailable.

When an issue occurs, the enterprise-level devices may generate an error message. For example, a user may receive an error message stating a file needed to process a user's request is missing, and the user may notify support personnel of the error message. Support personnel may then attempt to resolve the issue that caused the error message. For instance, if a file is missing, the support personnel may manually replace the missing file.

Figure 1:
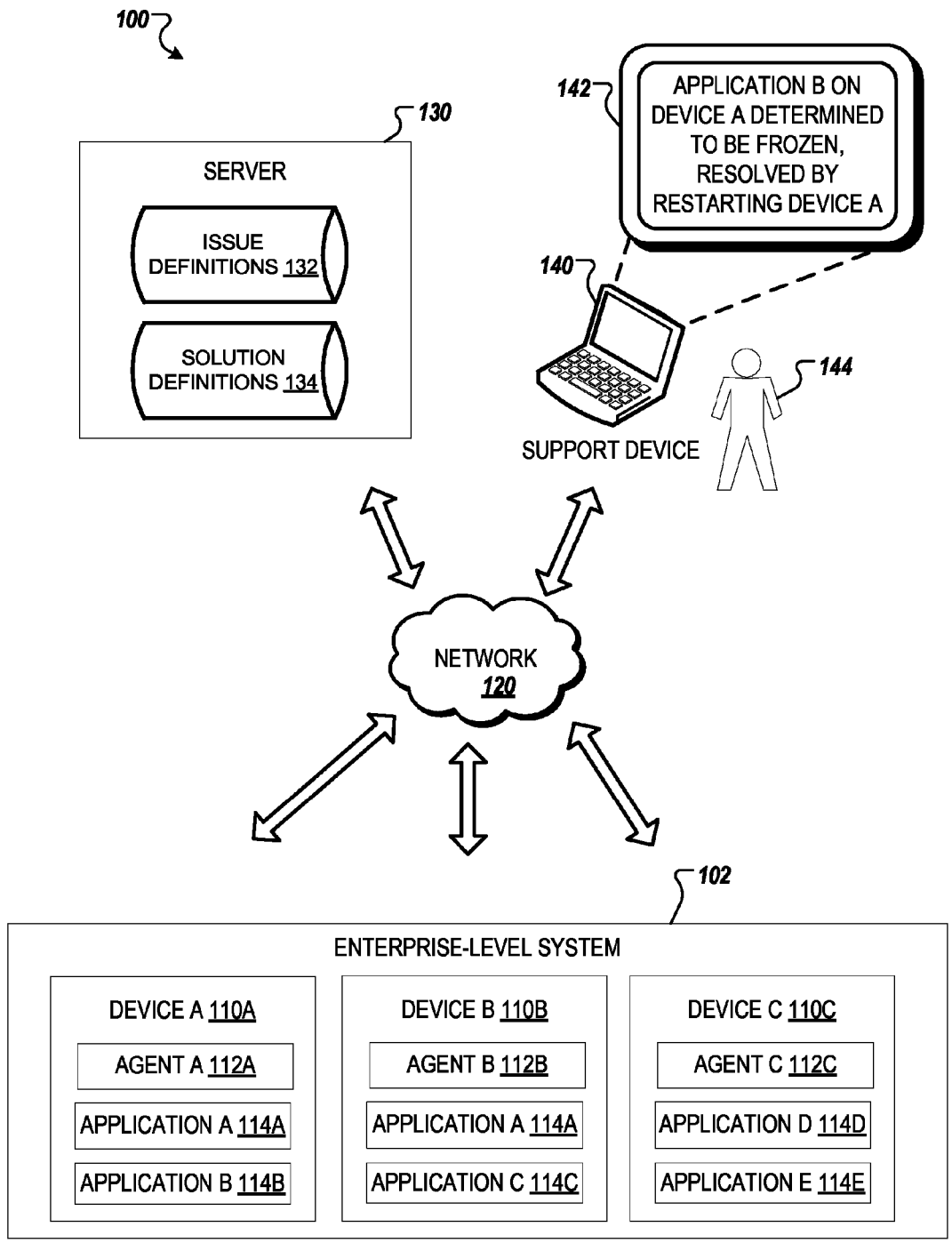
FIG. 1 illustrates a diagram of an exemplary system for issue detection and handling.

FIG. 1 illustrates an exemplary system 100 for issue detection and handling. The system 100 includes an enterprise-level system 102, a network 120, a server 130, and a support device 140.

In some implementations, the system 100 may attempt to identify and handle issues without input from support personnel 144. In general, the server 130 and enterprise-level system 102 may cooperate to determine an issue in the enterprise-level system 102 and determine if the issue can be handled without input from support personnel 144. If the issue can be handled without input from support personnel 144, the server 130 and enterprise-level system 102 may handle the issue and notify the support personnel 144 of the issue and how the issue was handled. If the issue cannot be handled without input from the support personnel 144, the server 130 may notify the support personnel 144 of the issue and request the support personnel 144 handle the issue.

The enterprise-level system 102 may include devices, e.g., Devices A-C 110A-C. The devices 110A-C may run various applications that may be similar applications, different applications, or both similar and different applications. For example, Device A 110A may be running Application A 114A and Application B 114B, Device B 110B may be running Application A 114A and Application C 114C, and Device C 110C may be running Application D 114D and Application E 114E.

Each device 110A-C may include an agent. For example, Device A 110A may include Agent A 112A, Device B 110B may include Agent B 112B, and Device C 110C may include Agent C 112C. An agent may monitor its corresponding device based on issue detection logic to collect issue detection information.

The issue detection logic may describe what the agent should include in the issue detection information, e.g., what information the agent should monitor, and how frequently the agent should collect the information, e.g., hourly or daily. The devices 110A-C may receive the issue detection logic from the server 130 and provide the collected issue detection information to the server 130 via a network 120. The network 120 may be a local area network, a wide area network, the Internet, etc.

The server 130 may include an issue definitions database 132. The issue definitions database 132 may store issue definitions that define various issues that may occur in the enterprise-level system 102. For example, one issue definition may define criteria used to determine that a particular application is frozen and actions needed to report a frozen application issue when detected.

The server 130 may provide issue detection logic for agents 112A-C on devices 110A-C based on the issue definitions. For example, the server 130 may determine based on an issue definition that Agent A 112A on Device A 110A should monitor an operating status of Application B 114B on Device A 110A. Based on the determination, the server 130 may provide issue detection logic to Device A 110A instructing Agent A 112A on Device A 110A to collect issue detection information by running the issue detection logic to monitor the operating status of Application B 114B.

The server 130 may receive issue detection information collected by the agents 112A-C on the devices 110A-C. The server 130 may determine an issue based on the issue detection information. For example, the server 130 may receive issue detection information from Device A 110A indicating that Agent A 112A monitored that Application B 114B on Device A 110A is frozen. The server 130 may then determine that a frozen application issue exists for Application B 114B on Device A 110A.

The server 130 may handle issues based on the determination of the issue. For example, based on the determination that a frozen application issue exists for Application B 114B on Device A 110A, the server 130 may handle the issue by instructing Device A 110A to restart. The server 130 may include a solution definitions database 134 storing solution definitions, and may handle issues based on the solution definitions.

The solution definitions may define how the server 130 will handle detected issues. For example, one solution definition may define that, if a frozen application issue is detected, the server 130 will attempt to handle the issue without support personnel intervention by restarting the device that is running the frozen application. The solution definitions may include solutions with various steps, and map the solutions to one or more issues. For example, an issue for a missing file and an issue for a corrupt file may be mapped to the same solution that handles the issues by replacing the missing or corrupt file.

The system 100 may include a support device 140 used by the support personnel 144. The support device 140 may be a portable computing device, e.g., laptop, tablet, mobile phone, etc., or any type of computing device, e.g., a desktop computer. The support device 140 may provide an interface 142 for the support personnel 144 to interact with system 100. For example, the interface 142 may display a notification to the support personnel 144 and allow the support personnel 144 to provide input to the system 100 for solving an issue determined by the system 100. In some examples, the support personnel 144 may use the interface 142 on the support device 140 to instruct the server 130 execute one or more scripts that may resolve the determined issue.

The server 130 may send notifications to the support device 140 for the support personnel 144 to view using the interface 142. For example, the notification may describe identified issues and how identified issues were handled. One example notification may be "Application B on Device A determined to be frozen, resolved by restarting Device A."

When the system 100 is unable to handle an identified issue, e.g., the issue is not mapped to a solution or the solution describes that the support personnel 144 should handle the issue, the server 130 may send a notification to the support device 140 instructing the support personnel 144 to handle the issue. For example, the notification may be "Application C on Device B determined to be crashing, please handle." In some implementations, the notification may identify scripts that the support personnel 144 may select to execute to handle the issue. The server 130 may determine the scripts to include in the notification based on the solution definitions.

Figure 2:
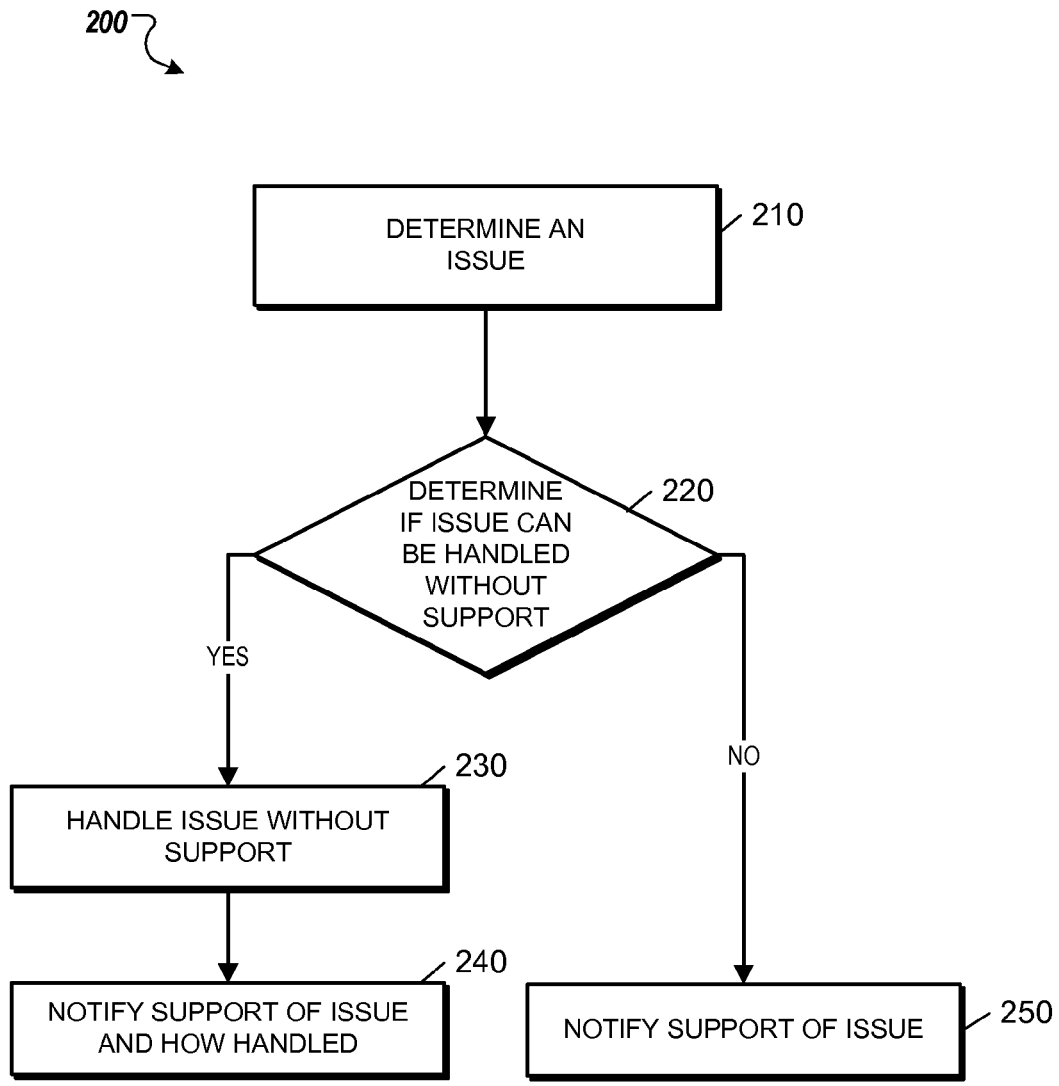
FIGS. 2 and 3 illustrate exemplary processes for issue detection and handling.

FIG. 2 illustrates an exemplary process 200 for issue detection and handling. The operations of the process 200 are described generally as being performed by the server 130. However, the process 200 may be performed by other systems or other configurations of the system 100. In some implementations, operations of the process 200 may be performed by one or more processors included in one or more electronic devices.

The server 130 determines an issue (210). For example, the server 130 may determine that there is a frozen application issue with Device A 110A. The issue may be determined by the server 130 based on issue detection information provided by device A 110A where the issue detection information is collected by Agent A 112A based on issue detection logic provided by the server 130.

The server 130 determines if the issue can be handled without support from the support personnel 144 (220). For example, the server 130 may determine if there is a solution definition that corresponds to the determined issue, and, if there is a corresponding solution definition, determine whether the solution definition indicates that the issue can be handled without support from the support personnel 144. If the server 130 determines that the solution definition indicates that the issue can be handled without support from the support personnel 144, then the server 130 determines that the issue can be handled without support from the support personnel 144. Otherwise, the server 130 determines that the issue cannot be handled without support from the support personnel 144.

If the issue can be handled without support, the server 130 handles the issue without support (230). For example, the server 130 provides solution logic to Agent A 112A that causes Device A 110A to restart.

The server 130 also notifies the support personnel 144 of the issue and how the issue was handled (240). For example, the server 130 may send a notification to the support device 140 via the network 120. The notification may state, "Application B on Device A determined to be frozen, resolved by restarting Device A."

If the server 130 determines that the issue cannot be handled without support, the server 130 notifies the support personnel 144 of the issue (250). For example, the server 130 may send a notification to the support device 140 via the network 120. The notification may state, "Application B on Device A determined to be frozen. No action taken. Please resolve."

Figure 3:
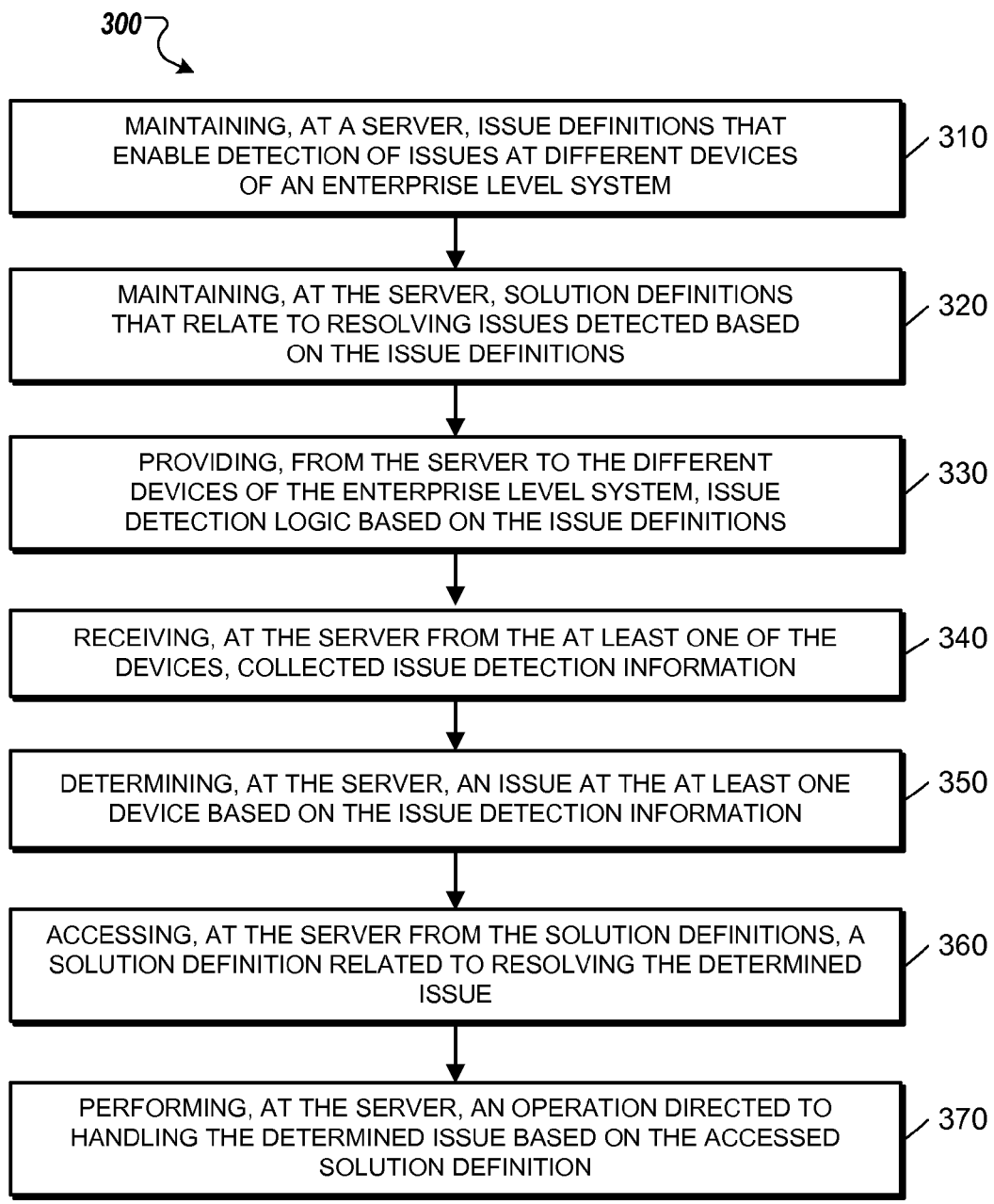

FIG. 3 illustrates an exemplary process 300 for issue detection and handling. The operations of the process 300 are described generally as being performed by the server 130. However, the process 300 may be performed by other systems or other configurations of the system 100. In some implementations, operations of the process 300 may be performed by one or more processors included in one or more electronic devices.

The server 130 maintains issue definitions that enable detection of issues at different devices of an enterprise level system (310). For example, the server 130 may include an issue definitions database 132 that stores issue definitions, where the issue definitions enable detection of issues at devices 110A-C of the enterprise level system 102.

The server 130 maintains solution definitions that relate to resolving issues detected based on the issue definitions (320). For example, the server 130 may include a solution definitions database 134 that stores solution definitions, where the solution definitions relate to resolving determined issues on devices 110A-C The server 130 provides, to the different devices of the enterprise level system 110A-C, issue detection logic based on the issue definitions (330). For example, the server 130 may provide issue detection logic based on the issue definitions stored in the issue definitions database 132 to the devices 110A-C.

The server 130 receives, from at least one of the devices, issue detection information collected by at least one of the devices based on the issue detection logic (340). For example, the agents 112A-C on the devices 110A-C may collect issue detection information for their corresponding devices 110A-C based on the issue detection logic received from the server 130 and the server 130 receives the collected issue detection information from the agents 112A-C. In this example, Device A 110A may transmit a frozen application detection collected by Agent A 112A to the server 130 via the network 120 and the server 130 may receive the frozen application detection provided by Device A 110A to the server 130.

The server 130 determines an issue at the at least one device based on the issue detection information (350). For example, the server 130 may determine that Device A 110A has a frozen application issue for Application B 114B based on the issue detection information collected by Agent A 112A.

The server 130 accesses, from the solution definitions, a solution definition related to resolving the determined issue (360). For example, the server 130 may access the solution definitions from the solution definitions database 134 and determine the solution definition that corresponds to the determined issue, e.g., the solution definition that resolves the issue.

The server 130 performs an operation directed to handling the determined issue based on the accessed solution definition (370). For example, based on the accessed solution definition, the server 130 may send an instruction to Device A 110A commanding Device A 110A to restart. Alternatively or additionally, based on the accessed solution definition, the server 130 may send a notification to the support device 140 describing the determined issue for the support personnel 144 to handle the determined issue.

FIG. 4 illustrates an exemplary issue definition table 400. The issue definition table 400 may be a table in which the server 130 stores the issue definitions. The issue definition table may include rows that correspond to issues and columns that correspond to values for that issue. One row may correspond to a definition of an issue. The columns may specify a unique identification of the issue 402, a category for the issue 404, a rule description for the issue 406, a monitoring component representing a component to be monitored 408, a device to which the issue relates 410, a path to be monitored 412, a rule for monitoring for the issue 414, a frequency of monitoring 416, and a status that corresponds to the issue 418.

For example, the server may provide issue detection logic to the device specified in the issue definition. In this example, the issue detection logic specifies that the specified path should be monitored and issue detection information should be collected at the specified frequency according to the specified rules. The server 130 may determine an issue based on applying the specified rule to the collected issue detection information. The issue definition table 400 may be used for issue detection in processes 200 and 300 described above.

FIG. 5 illustrates an exemplary solution definition table 500. The solution definition table 500 may be a table in which the server 130 stores the solution definitions. The solution definition table may include rows that correspond to steps of solutions and columns that correspond to values for the steps. Each solution may include one or more steps and, thus, may cover one or more rows. The columns specify a unique identification for the solution to which the step corresponds 502, an issue identification identifying one or more issues that are mapped to the solution 504, a step number specifying the number of the step in the solution 506, and actions specifying actions for the server 130 to perform 508. For example, the server 130 may determine the steps, represented by rows, that correspond to a solution that is mapped to a determined issue based on the issue identification. The server 130 may then perform the actions specified in the steps in the order specified by the step numbers. The solution definition table 500 may be used for issue handling in processes 200 and 300 described above.

Figure 6:
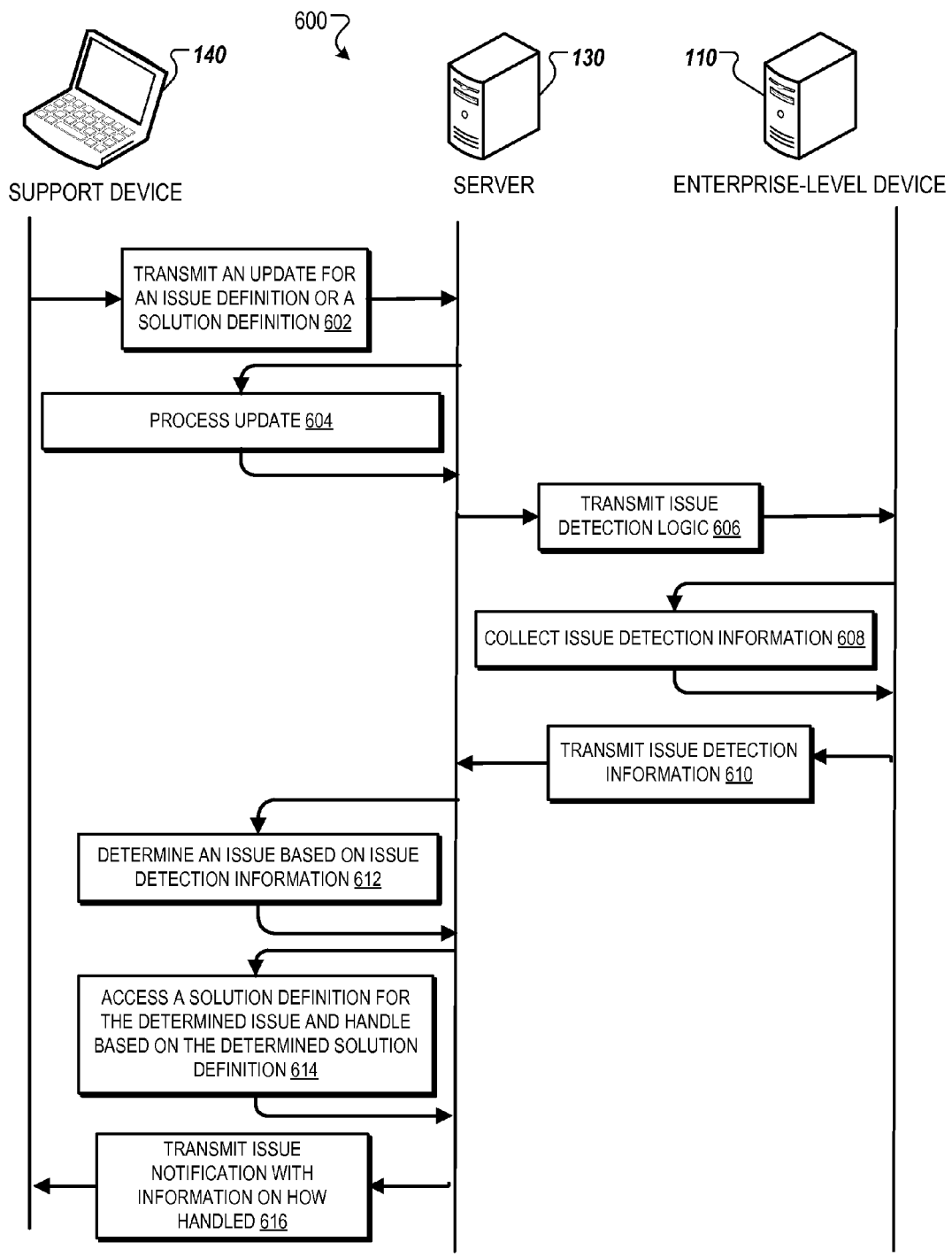
FIG. 6 illustrates an exemplary messaging diagram that illustrates examples of messages between a support device, a server, and an enterprise-level device.

FIG. 6 illustrates an exemplary process 600 that shows examples of messages between a support device 140, a server 130, and an enterprise-level device 110.

As shown, the support personnel 144 uses the support device 140 to transmit an update for an issue definition or a solution definition to the server 130 (602). The update may be a new definition or a modification to a definition. For example, the support device 140 may transmit a new issue definition for an issue of frozen application or a modification to an existing issue definition for the issue of frozen application.

The server 130 processes the update (604). For example, if the update is for a new issue definition, the server 130 may generate a new row for the issue in the issue definition table based on the update. If the update is for a modification to an existing issue definition, the server 130 may modify a row for the issue definition in the issue definition table based on the update.

If the update is for a new solution definition, the server 130 may generate one or more new rows for the solution in the solution definition table based on the update. If the update is for a modification to an existing solution definition, the server 130 may modify one or more rows for the solution definition in the solution definition table based on the update.

The server 130 transmits issue detection logic to the enterprise-level device 110 (606). The server 130 may determine the issue definitions in the issue definition table that correspond to the enterprise-level device 110 and provide issue detection logic for an agent 112 on the enterprise-level device 110 based on the determined issue definitions. For example, the server 130 may determine that the issue definition for the issue frozen application is associated with the enterprise-level device 110 and based on the determination, transmit issue detection logic to the enterprise-level device 110 that instructs the agent 112 on the enterprise-level device 110 to monitor if an application on the enterprise-level device 110 becomes frozen.

The enterprise-level device 110 collects issue detection information (608). The enterprise-level device 110 may collect issue detection information through the agent 112 on the enterprise-level device 110 based on the issue detection logic received from the server 130. For example, the agent 112 on the enterprise-level device 110 may collect information on the status of the application on the enterprise-level device 110 based on the issue detection logic.

The enterprise-level device 110 transmits issue detection information to the server 130 (610). For example, the agent 112 on the enterprise-level device 110 may transmit the collected information on the status of the application on the enterprise-level device 110.

The server 130 determines an issue based on the issue detection information (612). For example, the server 130 may determine that the collected information received from the enterprise-level device 110 corresponds to the issue definition for the issue of frozen application for the application on the enterprise-level device 110.

The server 130 accesses a solution definition for the determined issue and handles the determined issue based on the determined solution definition (614). The server 130 may access a solution definition that corresponds to the determined issue. For example, the server 130 may determine that the determined issue of frozen application corresponds with a solution definition for restarting the device and may handle the issue by instructing the enterprise-level device 110 to restart.

The server 130 transmits an issue notification to the support device 140 with information on how the issue was handled (616). For example, the server 130 may transmit a notification describing that the application on the enterprise-level device 110 was determined to have an issue of frozen application and the determined issue was handled by restarting the enterprise-level device 110.

In some implementations, the server 130 may include an issue definition for validating a set of configuration files across one or more devices of the enterprise-level system 102. The server 130 provides issue detection logic that instructs agents on the one or more devices to monitor the availability of a database. The server 130 monitors issue detection information collected by the agents and detects that a database is unavailable based on the collected issue detection information. The server 130 determines an issue of corrupt configuration file based on the unavailability of the database and accesses a solution definition that corresponds to the issue of corrupt configuration file. The corresponding solution definition defines that the server 130 should handle the issue by selecting a particular version number of the configuration file, replacing the configuration file with the selected configuration file, and notifying the support personnel 144 that the corrupt configuration file issue was detected and handled by replacing the configuration file with the configuration file with the particular version number.

In some implementations, the server 130 may include an issue definition for monitoring available bandwidth of a device of the enterprise-level system 102. The server 130 provides issue detection logic that instructs an agent on the device to monitor if files were successfully transferred to the device. The server 130 monitors issue detection information collected by the agent and detects that one or more files were not successfully transferred based on the collected issue detection information. The server 130 determines an issue of bandwidth availability based on the failure to transfer the one or more files and accesses a solution definition that corresponds to the issue of bandwidth availability. The corresponding solution definition defines that the server 130 should handle the issue by notifying support personnel 144 of the bandwidth issue and requesting the support personnel 144 resolve the bandwidth issue.

In some implementations, the server 130 may include an issue definition for monitoring the file format of files transferred to a device of the enterprise-level system 102. The server 130 may provide issue detection logic that instructs an agent on the device to monitor if particular files successfully transferred to the device have a particular format. The server 130 may monitor issue detection information collected by the agent and detect that one or more files transferred to the device are of the wrong format based on the collected issue detection information. The server 130 may determine an issue of file transfer corruption based on the incorrect file format and access a solution definition that corresponds to the issue of file transfer corruption. The corresponding solution definition may define that the server 130 should handle the issue by saving transferred files to a different location and notifying support personnel 144 of the issue and how the server 130 handled the issue.

In some implementations, the issue definitions may define issues corresponding to thresholds, e.g., thresholds defined for bandwidth peak, memory usage, computer processing unit usage, etc. The issue definitions may define that if thresholds are exceeded, an issue may be detected corresponding to exceeding the threshold. For example, based on an issue definition for exceeding a memory usage threshold, the server 130 may provide issue detection logic that instructs an agent on a device to monitor the memory usage on the device. The server 130 may detect that the memory usage on the device has exceeded the memory usage threshold based on the monitoring by the agent. Based on the detection, the server 130 may access a solution definition that corresponds to the issues corresponding to exceeding the thresholds where the solution definitions define that the server 130 should notify the support personnel 144 that the particular threshold has been exceeded by the device.

In some implementations, the server 130 may include a log of historical data regarding detected issues. The log may store details regarding each of the detected issues. Accordingly, the log tracks the number of occurrences of each of the detected issues. For example, for each issue detected by the server 130, the log may store information identifying the detected issue, when the issue was detected, which application(s) the detected issue was for, which device the detected issue was for, how the detected issue was handled, and if the detected issue was successfully handled by the server 130.

The server 130 may analyze the log to identify issues for which it may be desirable to add a solution definition that does not require input from support personnel 144 or desirable to improve a solution definition to increase the success rate for handling the detected issue by the server 130. For example, the server 130 may identify that the frozen issue may happen frequently with a low success rate so the server 130 may attempt to improve the solution definition corresponding to the frozen application issue or highlight to support personnel 144 that improving the solution definition corresponding to the frozen application issue may be desirable.

In some implementations, the server 130 may enable predefined solutions to be leveraged for new projects. For example, the server 130 may determine that a type of a new project may correspond to a type of an existing project for which the server 130 already has issue definitions and/or solution definitions. Based on the determination, the server 130 may associate the existing issue definitions and/or existing solution definitions with the new devices of the new project, or associate new issue definitions and/or new solution definitions with the new devices of the new project based on the existing issue definitions and/or existing solution definitions. The server 130 may then send agents on the new devices issue detection logic based on the associated issue definitions and/or handle issues detected based on the associated issue definitions using the associated solution definitions.

Figure 7:
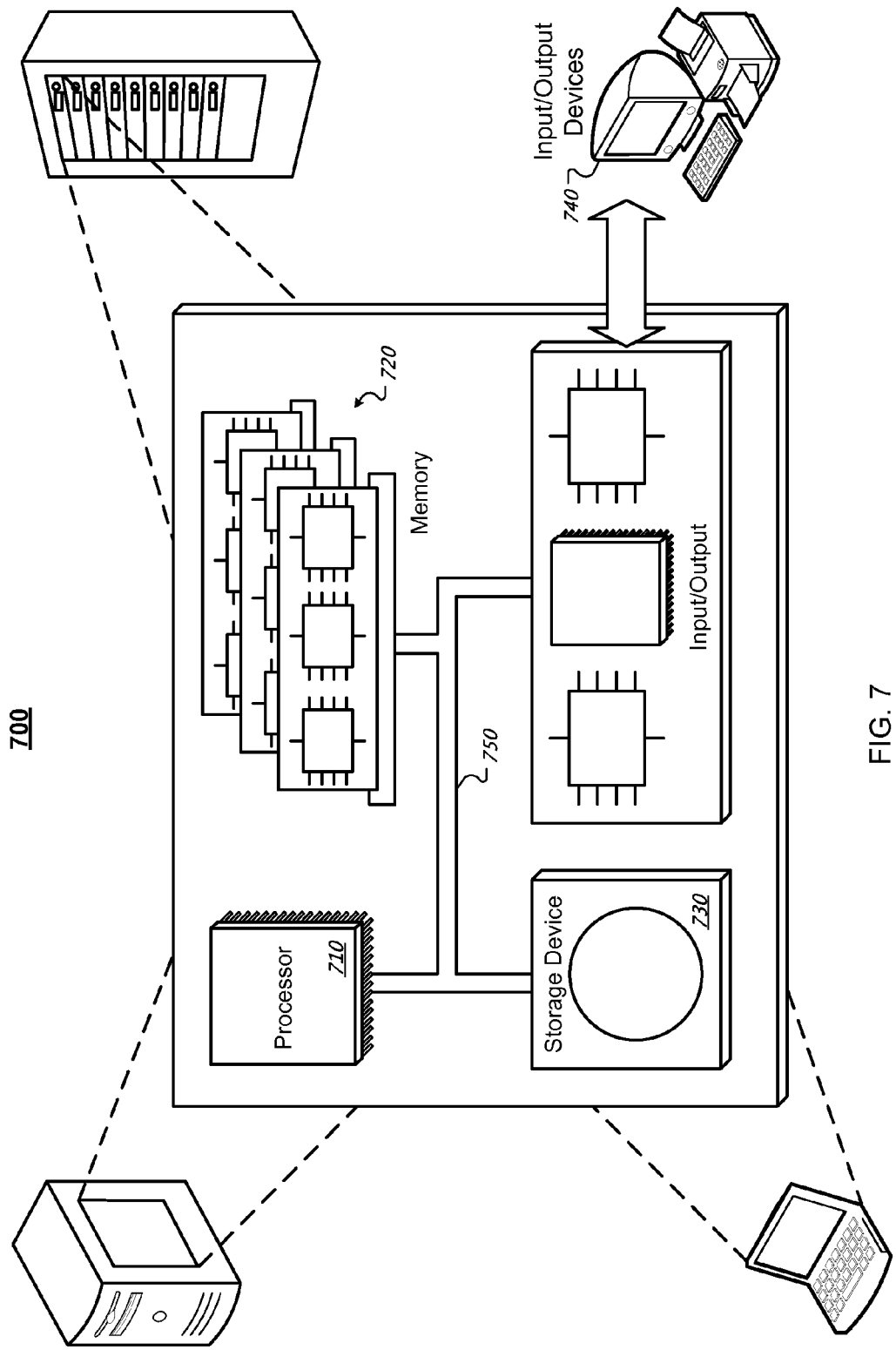
FIG. 7 illustrates a schematic diagram of an exemplary generic computer system.

FIG. 7 illustrates a schematic diagram of an exemplary generic computer system. The system 700 can be used for the operations described in association with the processes 200 and/or 300 according to some implementations. The system 700 may be included in the system 100.

The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. For example, through the disclosure, the server 130 and enterprise-level system 102 generally are described as separate entities. However, in some implementations, the server 130 and the enterprise-level system 102 may be implemented as part of a single computing system and/or enterprise-level system 102. Accordingly, other implementations are within the scope of the following claims.

What is claimed is:

1. A server comprising:
   at least one processor; and
   at least one memory coupled to the at least one processor having stored thereon instructions which, when executed by the at least one processor, causes the at least one processor to perform operations comprising:
   maintaining issue definitions that enable detection of issues at different devices of an enterprise level system that operate different applications;
   maintaining solution definitions that relate to resolving issues detected based on the issue definitions;
   providing, to each of the different devices of the enterprise level system, issue detection logic based on the issue definitions;
   receiving, from at least one of the different devices of the enterprise level system, issue detection information collected based on the issue detection logic;
   determining an issue at the at least one device based on the issue detection information;
   accessing, from the solution definitions, a solution definition related to resolving the determined issue; and
   performing an operation directed to handling the determined issue based on the accessed solution definition,
   wherein receiving, from at least one of the different devices of the enterprise level system, issue detection information comprises receiving, from each of the at least one of the different devices, an identification of the at least one device, and
   wherein accessing a solution definition related to resolving the determined issue is based on the identification of the at least one device.

2. The server of claim 1, wherein the operations further comprise:
   associating the issue definitions with the different devices.

3. The server of claim 2, wherein providing the issue detection logic comprises:
   providing each of the different devices issue detection logic based on the issue definitions and the associations of the issue definitions with the different devices.

4. The server of claim 1, wherein the operations further comprise:
   associating the solution definitions with the issue definitions.

5. The server of claim 4, wherein accessing the solution definition related to resolving the determined issue comprises:
   identifying the solution definition based on the association of the solution definition with the issue definition that enables detection of the determined issue.

6. The server of claim 1, wherein receiving the issue detection information comprises:
   receiving at regular intervals, from each of the different devices, issue detection information collected based on the issue detection logic.

7. The server of claim 1, wherein receiving the issue detection information comprises:
   receiving, from each of the different devices, a status indicator representing a status of a device.

8. The server of claim 1, wherein maintaining the issue definitions comprises:
   creating an issue definition that enables detection of an issue at one of the different devices of the enterprise level system.

9. The server of claim 1, wherein maintaining the solution definitions comprises:
   creating a solution definition that relates to resolving an issue at one of the different devices of the enterprise level system; and
   associating the solution definition with an issue definition that enables detection of the issue.

10. The server of claim 1, wherein performing an operation directed to handling the determined issue comprises:
    restarting a service used by the at least one device.

11. The server of claim 1, wherein performing an operation directed to handling the determined issue comprises:
    correcting data used by the at least one device.

12. The server of claim 1, wherein performing an operation directed to handling the determined issue comprises:
    providing solution logic to the at least one device for the at least one device to handle the determined issue.

13. The server of claim 1, wherein performing an operation directed to handling the determined issue comprises:
    providing, to a user, a notification identifying the determined issue and one or more actions taken to handle the determined issue.

14. The server of claim 1, wherein performing an operation directed to handling the determined issues comprises:
    providing, to a user, a notification identifying the determined issue and instructing the user to handle the determined issue.

15. The server of claim 1, wherein performing an operation directed to handling the determined issues comprises:
    providing, to a user, a notification identifying the determined issue, one or more scripts associated with the determined issue, and instructing the user to handle the determined issue.

16. The server of claim 1, further comprising:
    receiving, from a support device, an update to an issue definition of the issue definitions; and providing, to a device of the enterprise level system, updated issue detection logic based on the updated issue definition.

17. The server of claim 1, wherein providing issue detection logic based on the issue definitions comprises providing issue detection logic to an agent on a device of the enterprise level system and receiving issue detection information collected based on the issue detection logic comprises receiving issue detection information collected by the agent on the device using the issue detection logic.

18. A method comprising:
   maintaining, at a server, issue definitions that enable detection of issues at different devices of an enterprise level system that operate different applications;
   maintaining, at the server, solution definitions that relate to resolving issues detected based on the issue definitions;
   providing, to each of the different devices of the enterprise level system, issue detection logic based on the issue definitions;
   receiving, from at least one of the different devices of the enterprise level system, issue detection information collected based on the issue detection logic;
   determining, at the server, an issue at the at least one device based on the issue detection information;
   accessing, from the solution definitions, a solution definition related to resolving the determined issue; and
   performing, at the server, an operation directed to handling the determined issue based on the accessed solution definition,
   wherein receiving, from at least one of the different devices of the enterprise level system, issue detection information comprises receiving, from each of the at least one of the different devices, an identification of the at least one device, and
   wherein accessing a solution definition related to resolving the determined issue is based on the identification of the at least one device.

19. At least one computer-readable storage medium encoded with executable instructions that, when executed by at least one processor, cause the at least one processor to perform operations comprising:
   maintaining issue definitions that enable detection of issues at different devices of an enterprise level system that operate different applications;
   maintaining solution definitions that relate to resolving issues detected based on the issue definitions;
   providing, to each of the different devices of the enterprise level system, issue detection logic based on the issue definitions;
   receiving, from at least one of the different devices of the enterprise level system, issue detection information collected based on the issue detection logic;
   determining an issue at the at least one device based on the issue detection information;
   accessing, from the solution definitions, a solution definition related to resolving the determined issue; and
   performing an operation directed to handling the determined issue based on the accessed solution definition,
   wherein receiving, from at least one of the different devices of the enterprise level system, issue detection information comprises receiving, from each of the at least one of the different devices, an identification of the at least one device, and
   wherein accessing a solution definition related to resolving the determined issue is based on the identification of the at least one device.

* * * * *